Patented Oct. 31, 1933

1,933,367

UNITED STATES PATENT OFFICE 1,933,367

CONFECTION

Edgar B. Cloud, Hood River, Oreg., assignor, by mesne assignments, to Archie R. McCrady, South Bend, Ind.

No Drawing. Application December 23, 1927
Serial No. 242,300

3 Claims. (Cl. 99—16)

This invention relates to a process for making a fondant, cream or mixture thereof to be used in confections, gelatines or other edible products.

In the manufacture of coated candy having soft centers, the centers are usually formed of a fondant consisting of a soft body of sugar, partially inverted and partially crystallizable, semi-liquid at ordinary temperatures, having (in the absence of added coloring ingredients) an opaque white color, and wherein the sugar crystals, if any, are of sufficient fineness to be substantially impalpable to the tongue. A fondant is to be distinguished from a sugar-water syrup, which is a transparent liquid; from a mere sugar-water mixture, which contains sugar particles perceptible to the tongue; and from the various hard candies, which are solid. In order to retard the crystallization of the sucrose in such centers, and thereby try to cause the fondant to substantially retain its proper consistency, it is known to incorporate certain acids and enzymes or other substances into the fondant. The difficulty in adding such materials lies in the fact that the introduction of a foreign substance into the confection sometimes affects the taste and color of the same.

In the manufacture of candies with cream centers containing natural fruit and fruit juices, it is also desirable to keep the cream centers from becoming inverted. It has, therefore, been impossible by known methods to incorporate any appreciable amounts of fruit or fruit juices intimately with sugar or a fondant and have the sugar or fondant retain its proper consistency, since the effect of the acids in the fruit, and of the heating necessary to get the sugar dissolved in the juices, is to invert a large percentage of the sucrose, with the result that a syrup is produced. The present invention eliminates the use of the acids and other substances above discussed, and also makes it possible to intimately incorporate into the sugar a large percentage of fruit or its juices, in fact to give a balanced blend of the full natural fruits flavor desired without the use of acids, extracts or other artificial flavoring materials. The fondant prepared according to this invention will keep for months and will neither crystallize nor liquefy.

As illustrating the process, the following example is given, but it should be understood that the example is to be considered as illustrating the invention rather than limiting it.

The fruit, whether in the form of whole fruit, pulp or juice, will generally, for the sake of convenience, be kept available packed with a certain amount of sugar to prevent fermentation and preserve its flavor. The percentage of sugar to fruit will necessarily vary and must be taken into account in the subsequent steps, but a ratio of three parts of fruit to one of sugar may be taken for purposes of illustration. To five ounces of this sweetened fruit is added one pound of powdered sugar. No water is added; the mixture is then heated as rapidly as possible, it being stirred vigorously to prevent overheating. When the temperature reaches the neighborhood of 180° F. the batch is tested by tasting, and when it feels smooth to the tongue, indicating that the sugar is practically dissolved, the mix is cooled as rapidly as possible. The maximum temperature will usually be between 190° and 200°, but good results may under some circumstances be obtained by temperatures as low as 180° or as high as 220°. When sufficiently cooled, the batch is put through the usual beating processes to make it into fondant or cream.

The fondant may then be incorporated in bon bons, hand rolls, or cast pieces and coated in any known manner, but it should be noted that its use is not limited to coated candy.

All the foregoing conditions may be varied somewhat to suit different circumstances and materials. The sugar may vary in fineness from XXXX to the finest possible, but if it is much coarser than XXXX, it takes longer to dissolve, with the result that the heating must be continued longer, with undesirable results.

Any variety of cooked or uncooked fruit may be used, but the proportion of fruit to sugar will vary widely with the nature of the fruit and its preparation, the more acid fruits requiring a larger proportion of sugar. It is desirable to put in enough fruit to get the desired flavor without the use of artificial flavoring or acids, but if too much fruit is used, it inverts too great a part of the sucrose in the mix and the cream will become too soft. There must be left in the mix sufficient crystallizable sugar to bring about a very fine recrystallization by the process called creaming, but this recrystallization is retarded by the presence of the fruit acids.

The maximum temperature required will vary with the fineness of the sugar, the object being to get the sugar dissolved in the fruit juices at the lowest possible temperature, and to maintain the maximum temperature as short a time as possible. The object here is to get the sugar dissolved while inverting a minimum amount of the sugar. The three essential factors in making the candy are sugar, fruit, and temperature, and these factors must be balanced to produce the best results. Any variation in these factors should be balanced by a corresponding variation in one or both of the others, as is known in the art.

The advantage of this process lies in the fact that a fondant may be produced containing any amount desired up to over 25% of fruit, the sugar being dissolved in the fruit juices but only a small part thereof being inverted thereby. The product does not tend to ferment, and maintains practically a constant consistency over a period of many months or even a year.

Having described my invention, what I claim as new and desire to secure by Letters Patent of the United States is:

1. The method of making a fondant which comprises mixing sugar with fruit, dissolving the sugar in the juices of the fruit by heating to a temperature lower than the boiling point of the mixture, and rapidly cooling and agitating the resulting solution, until a fondant is produced.

2. The method of making a fondant which comprises mixing sugar with fruit, dissolving the sugar in the juices of the fruit by rapidly heating without boiling, rapidly cooling the resulting solution, and agitating the mass during both heating and after cooling.

3. The method of making a fondant which comprises dissolving sugar in fresh fruit juices without boiling, cooling the solution as soon as the sugar is substantially dissolved, and beating the solution to produce a fondant.

EDGAR B. CLOUD.